United States Patent [19]

Ellers et al.

[11] 4,048,807
[45] Sept. 20, 1977

[54] METHODS FOR EMPLACING AND MAINTAINING TRANSMISSION LINES

[75] Inventors: Fred S. Ellers, Menlo Park; Hugh G. Hally, San Mateo, both of Calif.; Edward E. McIlveen, Upper Montclair, N.J.; William A. Doble, San Mateo, Calif.

[73] Assignees: Bechtel International Corporation, San Francisco, Calif.; The Okonite Company, Ramsey, N.J.

[21] Appl. No.: 697,412

[22] Filed: June 18, 1976

Related U.S. Application Data

[63] Continuation of Ser. No. 545,214, Jan. 29, 1975, abandoned.

[51] Int. Cl.² ............................................. F16L 1/02
[52] U.S. Cl. ..................................................... 61/105
[58] Field of Search ................ 61/72.4, 105, 106, 107; 174/11 R, 37; 254/134.3 SC

[56] References Cited

U.S. PATENT DOCUMENTS

| 2,476,953 | 7/1949 | Bennett | 61/105 |
| 3,530,680 | 9/1970 | Gardner | 61/107 |
| 3,582,533 | 6/1971 | Albright et al. | 61/72.4 X |
| 3,589,135 | 6/1971 | Ede | 61/105 |
| 3,862,349 | 1/1975 | Watts | 61/106 |

OTHER PUBLICATIONS

Oil & Gas Journal, Jan. 26, 1959, vol. 57, No. 4, p. 105.
Electric Light and Power, Nov. 1966, pp. 57-60.
Post Office Electrical Engineers Journal (Great Britain), vol. 66, July 1973, pp. 114-118.

Primary Examiner—Paul R. Gilliam
Assistant Examiner—David H. Corbin

[57] ABSTRACT

A transmission line is established between two distant points utilizing a pair of pipelines, one of which is insertable within the other. The outer or larger diameter pipeline is first installed or laid between the two distant points and the pipe is filled with a suitable high density lubricating liquid. The other pipeline which carries and houses the transmssion line is initially filled with an inert gas and in this condition the pipeline and transmission line are "floated" into and through the outer pipeline. After both the inner pipeline and transmission line are in place inside the outer pipeline, the high density lubricating liquid between the pipes may be removed and substituted with a high thermal-conducting non-polluting fluid. The inert gas within the inner pipeline is also replaced with a standard electrical grade insulating oil.

The transmission line and inner pipeline may be retrieved from within the outer pipeline for maintenance or repair by reversing the floatation process and pulling the inner pipeline as required. During retrieval operation, the inner pipeline and transmission line are withdrawn into a storage pipeline or passageway.

6 Claims, 2 Drawing Figures

METHODS FOR EMPLACING AND MAINTAINING TRANSMISSION LINES

This is a continuation of application Ser. No. 545,214, filed Jan. 29, 1975.

BACKGROUND OF THE INVENTION

It is common practice to install transmission lines underground through a pipeline. This is often accomplished by progressively joining 30 to 50 ft. lengths of pipe end to end; lowering the assembled pipeline into a trench; and then threading the transmission line through the pipeline. However, manholes are required at 2,000 to 4,000 ft. intervals along the pipeline to permit splicing and threading of the insulated conductors. This method is obviously limited to application where the pipeline is accessable at regular and comparatively short intervals. It cannot be used in many applications where manholes cannot be installed. Thus, the method is also impractical for emplacing transmission lines in many underwater installations.

One method that is used for submarine installations consists of sequentially joining sections of pipe and electrical conductors on land and then pulling the entire pipeline into position. However, this method must be modified when the transmission line is of any great length. As an example, a 3-mile crossing to an off-shore nuclear power plant may require several hundred lengths of pipe. This length of pipe cannot be pulled from shore in one operation because of the tremendous drag forces, not to mention probable space limitations. Therefore, the pipeline may be made up in five or more sections which are laid out side by side, each containing a transmission cable. The first section is pulled toward the off-shore power plant until its trailing edge is at the shoreline. The transmission cable and pipeline of a second section is then attached to the first and the procedure is repeated until all sections are joined to span the crossing.

The foregoing method and installation presents several disadvantages. First, repairs cannot be made in the event of either external damage to the pipeline or internal electrical breakdown; and, secondly, external damage to the pipeline may result in an "oil spill" since power transmission lines are usually filled with oil as an insulation and coolant.

SUMMARY OF THE INVENTION

This invention provides an external housing or conduit in the form of a preliad, continuous pipeline, for exampe, a 24-inch diameter heavy wall steel pipe. A smaller diameter conduit, such as 20-inch steel pipe containing a transmission line is then introduced through one end of the prelaid pipeline and moved axially therethrough from terminal to terminal. To achieve this, the smaller diameter conduit is initially pressurized with an inert gas, such as nitrogen, and the outer pipeline is filled with a high density lubricating liquid, for example, oil. The oil provides buoyancy to the inner pipeline which allows the smaller diameter conduit (containing the transmission line) to be pushed or drawn into and through the outer conduit. Thus, the inner conduit is literally "floated" into position. After this position is achieved, the floatation liquid, i.e. the oil, if used, is substituted with a non-polluting liquid having good thermal conductivity, such as water. In addition, the nitrogen gas in the inner pipeline is replaced with a standard grade electrical insulating oil.

In the event that maintenance or repair of the transmission line becomes necessary, the inner conduit may be retrieved by reversing the floatation process. During the retrieval operation, the inner conduit and transmission line are withdrawn into a storage pipeline or passageway provided for that purpose.

The following objects and advantages of this invention are to be noted:

1. The transmission line is retrievable for repair on shore. Maintenance can be accomplished under all weather conditions without boats or marine equipment.
2. Protection is provided against possible oil spills.
3. The utilization of a conduit within a conduit provides increased coolant circulation, thereby raising the capacity of the transmission.
4. A deferral of the investment in transmission cables is possible by initially installing only the outer conduit and inserting the cables and inner conduit only when needed.
5. The integrity and condition of the inner conduit may be monitored.
6. The inner conduit is protected against corrosion and damage.
7. The outer conduit may be permanently installed with gravel backfill, which affords better cooling conditions.
8. Exceptionally long transmission lines may be installed through a hostile environment or under conditions which render the lines inaccessable.

DETAILED DESCRIPTION OF METHODS

Figure 1:
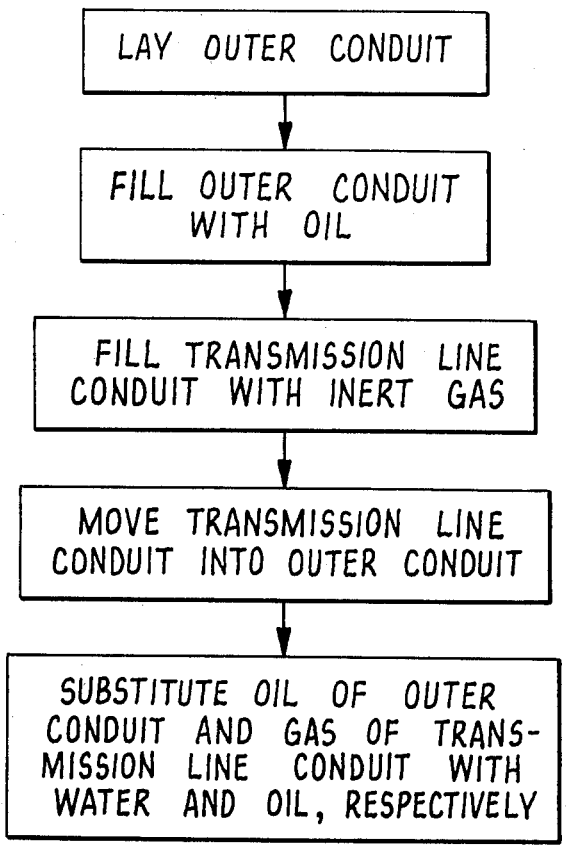
FIG. 1 is a flow diagram of the preferred method for emplacing a transmission line in accordance with the invention.
Figure 2:
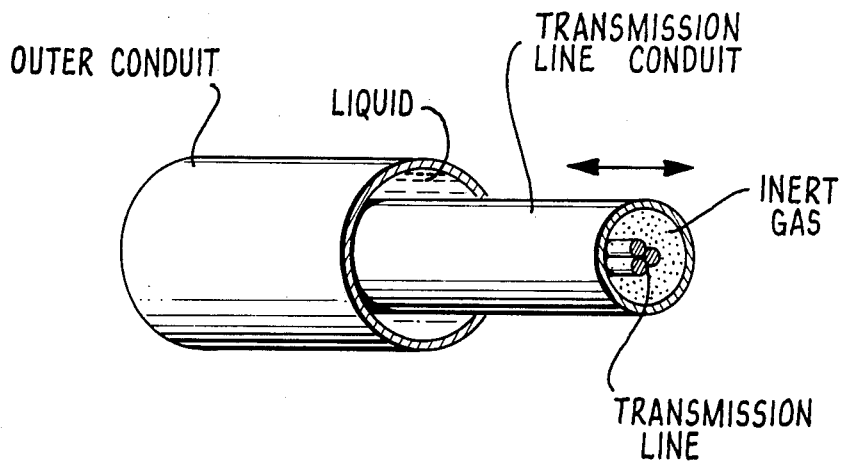
FIG. 2 is a perspective view of a pair of inner and outer conduits and a power transmission line as positioned while practicing the method of the invention.

This invention has particular application to the emplacement and maintenance of power transmission lines extending between an off-shore power plant and a mainland. These power transmission lines may extend for several miles along the bottom of a lake, bay or ocean. In accordance with practicing this invention, the power transmission lines will be contained in an outer conduit and an inner transmission line conduit, as illustrated in FIG. 2; and the installation or emplacement of the conduits and transmission line is carried out by the procedure outlined in FIG. 1.

More specifically, the outer conduit is formed, or laid along the bottom of the ocean between the off-shore power plant and a maintenance house on the mainland, in a preferred installation, these conduits would consist of pipeline made up of a 24-inch diameter heavy-wall steel pipe that is either buried in a trench or covered with gravel back-fill. The outer conduit is then filled with a liquid, such as oil, which possesses good lubricating qualities and density. The transmission line and transmission line conduit are then assembled in sections on the mainland in a manner consistent with that practiced prior to this invention. In that regard, both the transmission line and transmission line conduit may be of standard construction, and the conduit may be made from steel pipe having a 20-inch diameter. The transmission line conduit is initially filled with an inert gas such as nitrogen, and this gas is maintained under pressure while the transmission line conduit is fed into and through the first or outer conduit. After one section of the transmission line conduit has been fed into the outer conduit, a second section of transmission line and transmission line conduit is connected to the trailing edge of the first. Inert gas is again applied under pressure into the transmission line conduit and the second section is moved into and through the outer conduit. This process is repeated until all of the sections of transmission line conduit are joined end to end, spanning the distance between the off-shore power plant and mainland.

The foregoing procedure contemplates that the weight to volume ratio of the transmission line and transmission line conduit together will approach the density of the oil within the outer conduit. Thus, the buoyancy of the inner transmission line conduit in the oil results in a partial floatation action which substantially lessens the frictional drag between the conduits.

Once the transmission line conduit is in place, spanning the distance between the off-shore power plant and the mainland, the inert gas within the conduit is replaced with standard grade electrical insulating oil or fluid. Also, the oil, if used, within the outer conduit is replaced with water or some other non-polluting liquid having good thermal conductivity.

This invention further contemplates that the liquid pressures or pressure differential between liquids within the inner and outer conduits may be monitored to detect leaks. For example, a drop in pressure within the inner conduit or a change in the pressure differential of the liquids, would indicate that there was a leak. In such event, or in the event that a break occurs in the transmission cable, the transmission line and transmission line conduit would be retracted to expose the fault and make repairs. This is accomplished by reversing the floatation process described in connection with emplacement procedures. In brief, the electrical insulating oil within the transmission line conduit would be removed and replaced with the inert gas, thereby increasing buoyancy of the conduit; and the water within the outer conduit would be substituted with oil to provide greater lubrication between surfaces of the conduits.

Repair and maintenance would be enhanced by providing storage pipelines or passageways on the mainland to receive the transmission line conduits as they are retracted. One or several such storage pipelines or passageways may be provided to accommodate either the entire length of the conduit or one or several sections thereof. Such passageways or pipelines need not be in a straight line, but may be in a variety of patterns fully utilizing a smaller area, as in a series of s-shaped patterns.

From the foregoing, it is apparent that we have provided a novel and improved method of installing long lengths of conventional pipe-type transmission cable in relatively inaccessible locations. The installation is such that maintenance, repair or replacement of each such length can be effected regardless of weather traffic conditions. In addition, the outer pipe acts as a barrier to environmental pollution by an insulating oil provided in the inner pipe in the event a rupture should occur in such inner pipe. Further, one is able to monitor constantly the integrity of the pipes through hyraulic differential detectors responsive to the pressure of the fluid in the respective pipes. Further, the use of the two pipe constructions enables the conductors to be installed or replaced with higher rated components at any time during the life of the outer containment. Further, the current carrying capacity of the system can be significantly increased by circulation and cooling of the containment fluids.

What is claimed is:

1. A method for emplacing and maintaining a transmission line between two distant points comprising the steps: forming a first conduit between two distant points; filling said first conduit with a liquid; inserting a transmission line conduit into and through said first conduit, said transmission line conduit containing an electrical transmission line and an inert gas, the weight to volume ratio of the transmission line conduit and contents being substantially equal to the density of the liquid within the first conduit, whereby the liquid filling said first conduit provides sufficient buoyancy and lubrication to float the transmission line conduit and contents axially through the first conduit; then substituting the inert gas within said transmission line conduit with an electrical insulating liquid, thereby decreasing the buoyancy of said transmission line conduit and contents.

2. The method of claim 1, the first conduit being initially filled with an oil having good lubricating qualities, and further wherein the oil within the first conduit is substituted with a non-polluting liquid having good thermal conductivity after said transmission line conduit is positioned within said first conduit.

3. The method of claim 1 and the further step of monitoring the fluid pressures within said first conduit and said transmission line conduit to detect fluid leaks.

4. The method of claim 1, and the further steps of replacing the liquid within the transmission line conduit with a gas to reestablish sufficient buoyancy to float the transmission line and contents, then withdrawing the transmission line conduit and contents for maintenance or repair.

5. The method of claim 1, and the further step of forming a storage passageway having an entrance proximate to one of the two distant points, and withdrawing the transmission line conduit from the first conduit while advancing said transmission line conduit into said storage passageway.

6. The method of claim 1, the first conduit being filled with a lubricating oil while the transmission line conduit and contents are moved axially through and positioned within the first conduit; and the further step of substituting the lubricating oil within the first conduit with a non-polluting liquid having good thermal conductivity after said second conduit is positioned within said first conduit.

* * * * *

UNITED STATES PATENT OFFICE
CERTIFICATE OF CORRECTION

Patent No. 4,048,807　　　　　　　　Dated September 20, 1977

Inventor(s) Fred S. Ellers et al

It is certified that error appears in the above-identified patent and that said Letters Patent are hereby corrected as shown below:

Column 1, line 16, "application" should be "applications".

Column 1, line 50, "preliad" should be "prelaid".

Column 2, lines 53 and 54, ", in" should be ". In".

Column 3, line 57, "weather traffic" should be "weather or traffic".

Signed and Sealed this

*Sixth* Day of *December 1977*

[SEAL]

*Attest:*

RUTH C. MASON　　　　　　LUTRELLE F. PARKER
*Attesting Officer*　　*Acting Commissioner of Patents and Trademarks*